(12) United States Patent
Joshi et al.

(10) Patent No.: US 9,900,230 B2
(45) Date of Patent: Feb. 20, 2018

(54) DISSEMINATION OF QUALITY OF SERVICE INFORMATION IN A DISTRIBUTED ENVIRONMENT

(71) Applicant: Avaya Inc., Santa Clara, CA (US)

(72) Inventors: Vivek Joshi, Pune (IN); Anirudh Patel, Pune (IN); Manish Patil, Pune (IN)

(73) Assignee: Avaya Inc., Santa Clara, CA (US)

( * ) Notice: Subject to any disclaimer, the term of this patent is extended or adjusted under 35 U.S.C. 154(b) by 75 days.

(21) Appl. No.: 14/990,095

(22) Filed: Jan. 7, 2016

(65) Prior Publication Data

US 2017/0201440 A1 Jul. 13, 2017

(51) Int. Cl.
  *H04L 12/26* (2006.01)
  *H04L 12/851* (2013.01)
  *H04L 29/12* (2006.01)

(52) U.S. Cl.
  CPC ...... *H04L 43/0852* (2013.01); *H04L 43/0823* (2013.01); *H04L 43/16* (2013.01); *H04L 47/24* (2013.01); *H04L 61/2514* (2013.01); *H04L 61/609* (2013.01)

(58) Field of Classification Search
  CPC . H04L 43/0823; H04L 43/0852; H04L 43/16; H04L 47/24; H04L 61/2514; H04L 61/609
  See application file for complete search history.

(56) References Cited

U.S. PATENT DOCUMENTS

| 5,903,558 A | * | 5/1999 | Jones | H04L 12/2861 370/230 |
| 8,068,446 B2 | * | 11/2011 | Noh | H04W 76/028 370/311 |
| 2002/0026503 A1 | * | 2/2002 | Bendinelli | H04L 12/4641 709/220 |
| 2002/0049687 A1 | * | 4/2002 | Helsper | G06F 11/3447 706/45 |
| 2002/0099850 A1 | * | 7/2002 | Farber | G06F 9/505 709/245 |
| 2002/0152297 A1 | * | 10/2002 | Lebourg | H04L 41/0213 709/223 |
| 2003/0060209 A1 | * | 3/2003 | Bruin | H04W 16/00 455/452.1 |
| 2003/0061351 A1 | * | 3/2003 | Prathima | H04L 41/0896 709/226 |

(Continued)

Primary Examiner — Jenee Holland
(74) Attorney, Agent, or Firm — Sheridan Ross P.C.

(57) ABSTRACT

A request to subscribe to QoS information is received from a monitoring element. A monitoring element may be a centralized communication system, such as a Private Branch Exchange (PBX). The QoS information is from a plurality of network elements at a plurality of locations. A network element may be, for example, a communication endpoint, a router, a media server, and/or the like. The QoS information is based on a location map that includes information for the plurality of locations. The plurality of locations are controlled by separate communication systems. A determination is made whether a threshold for the QoS information has been reached. If the threshold for the QoS information has reach reached, a notification is sent to the monitoring element. Upon receiving the notification, the monitoring element can cause an action to occur to address a QoS problem.

20 Claims, 5 Drawing Sheets

(56) References Cited

U.S. PATENT DOCUMENTS

| | | | |
|---|---|---|---|
| 2003/0138251 A1* | 7/2003 | Jayaram | H04B 10/077 398/38 |
| 2003/0161630 A1* | 8/2003 | Jayaram | H04B 10/077 398/9 |
| 2003/0198204 A1* | 10/2003 | Taneja | H04L 5/023 370/332 |
| 2003/0199278 A1* | 10/2003 | Lee | H04L 1/0006 455/452.2 |
| 2003/0202112 A1* | 10/2003 | Bowman | H04N 7/147 348/261 |
| 2003/0202469 A1* | 10/2003 | Cain | H04L 45/20 370/230 |
| 2003/0204587 A1* | 10/2003 | Billhartz | H04L 43/0823 709/224 |
| 2003/0204616 A1* | 10/2003 | Billhartz | H04L 45/302 709/235 |
| 2004/0176040 A1* | 9/2004 | Thornton | H04W 24/08 455/67.11 |
| 2005/0047579 A1* | 3/2005 | Salame | H04L 29/06027 379/265.09 |
| 2005/0060364 A1* | 3/2005 | Kushwaha | H04L 41/5009 709/200 |
| 2005/0120279 A1* | 6/2005 | Furukawa | H04L 63/0236 714/43 |
| 2005/0201302 A1* | 9/2005 | Gaddis | H04L 45/02 370/254 |
| 2006/0142001 A1* | 6/2006 | Moisan | H04L 41/5009 455/428 |
| 2006/0159017 A1* | 7/2006 | Mun | H04L 41/5003 370/230 |
| 2006/0212594 A1* | 9/2006 | Haner | H04L 47/24 709/232 |
| 2007/0008894 A1* | 1/2007 | Lynch | H04L 43/067 370/244 |
| 2007/0053299 A1* | 3/2007 | Khan | H04L 41/00 370/238 |
| 2007/0110017 A1* | 5/2007 | Fulknier | H04L 45/00 370/338 |
| 2007/0171816 A1* | 7/2007 | Pfleging | H04L 43/0852 370/225 |
| 2007/0291648 A1* | 12/2007 | Pfleging | H04L 29/06027 370/237 |
| 2008/0008093 A1* | 1/2008 | Wang | H04L 47/10 370/235 |
| 2008/0008183 A1* | 1/2008 | Takagaki | H04L 45/00 370/392 |
| 2008/0091978 A1* | 4/2008 | Brodsky | G06F 11/3466 714/38.14 |
| 2008/0165683 A1* | 7/2008 | Saha | H04L 45/00 370/231 |
| 2008/0293436 A1* | 11/2008 | Fok | G01S 5/0205 455/456.2 |
| 2009/0011768 A1* | 1/2009 | Seok | H04L 41/5003 455/450 |
| 2009/0018890 A1* | 1/2009 | Werth | G06Q 10/063112 705/7.14 |
| 2009/0104911 A1* | 4/2009 | Watanabe | H04W 36/30 455/436 |
| 2009/0143065 A1* | 6/2009 | Mattila | H04L 41/06 455/423 |
| 2009/0268718 A1* | 10/2009 | Liao | H04L 41/5019 370/352 |
| 2009/0296635 A1* | 12/2009 | Hui | H04W 48/10 370/328 |
| 2009/0296827 A1* | 12/2009 | Karaoguz | H04N 21/23439 375/240.26 |
| 2009/0300688 A1* | 12/2009 | Karaoguz | H04N 21/23805 725/62 |
| 2009/0318132 A1* | 12/2009 | Chiou | H04W 24/08 455/423 |
| 2010/0115605 A1* | 5/2010 | Beattie | H04L 41/5019 726/15 |
| 2010/0298022 A1* | 11/2010 | Karim | H04W 24/02 455/522 |
| 2010/0315968 A1* | 12/2010 | Zhou | H04L 1/0009 370/252 |
| 2011/0134777 A1* | 6/2011 | Park | H04L 41/5019 370/252 |
| 2011/0222406 A1* | 9/2011 | Persson | H04L 47/12 370/236 |
| 2011/0249580 A1* | 10/2011 | Ikeda | H04L 41/0816 370/252 |
| 2012/0052873 A1* | 3/2012 | Wong | H04W 52/0251 455/456.1 |
| 2012/0089845 A1* | 4/2012 | Raleigh | H04L 12/14 713/176 |
| 2013/0016624 A1* | 1/2013 | Li | H04L 41/5009 370/252 |
| 2013/0169881 A1* | 7/2013 | Kano | H04N 5/46 348/706 |
| 2014/0179238 A1* | 6/2014 | Wynn | H04L 41/5067 455/67.11 |
| 2014/0287730 A1* | 9/2014 | Masuda | H04W 24/02 455/414.3 |
| 2014/0317262 A1* | 10/2014 | Bouvet | H04L 41/08 709/223 |
| 2015/0146675 A1* | 5/2015 | Zhang | H04L 41/0886 370/329 |
| 2015/0189539 A1* | 7/2015 | Li | H04W 28/24 370/230 |
| 2015/0295802 A1* | 10/2015 | Balakrishnan | H04L 43/0811 370/248 |
| 2015/0382270 A1* | 12/2015 | Kordybach | H04W 36/14 370/331 |

* cited by examiner

DISSEMINATION OF QUALITY OF SERVICE INFORMATION IN A DISTRIBUTED ENVIRONMENT

TECHNICAL FIELD

The systems and methods disclosed herein relate to electronic communication systems and in particular to managing Quality of Service (QoS) in a distributed environment.

BACKGROUND

Currently, voice quality monitoring exists only in single box solutions. For example, where a Media Gateways is tied to an Application Server. In a distributed environment, Quality of Service (QoS) information is not always shared between various elements in the distributed environment. As a result, call management in the distributed environment is limited.

BRIEF SUMMARY

Systems and methods are provided that can provide intelligent and dynamic decisions to address Quality of Service (QoS) problems. A request to subscribe to QoS information is received from a monitoring element. A monitoring element may be a centralized communication system, such as a Private Branch Exchange (PBX). The QoS information is from a plurality of network elements at a plurality of locations. A network element may be, for example, a communication endpoint, a router, a media server, and/or the like. The QoS information is based on a location map that includes information for the plurality of locations. The plurality of locations are controlled by separate communication systems. A determination is made whether a threshold for the QoS information has been reached. If the threshold for the QoS information has been reached, a notification is sent to the monitoring element. Upon receiving the notification, the monitoring element can cause an action to occur to address a QoS problem.

DETAILED DESCRIPTION

Figure 1:
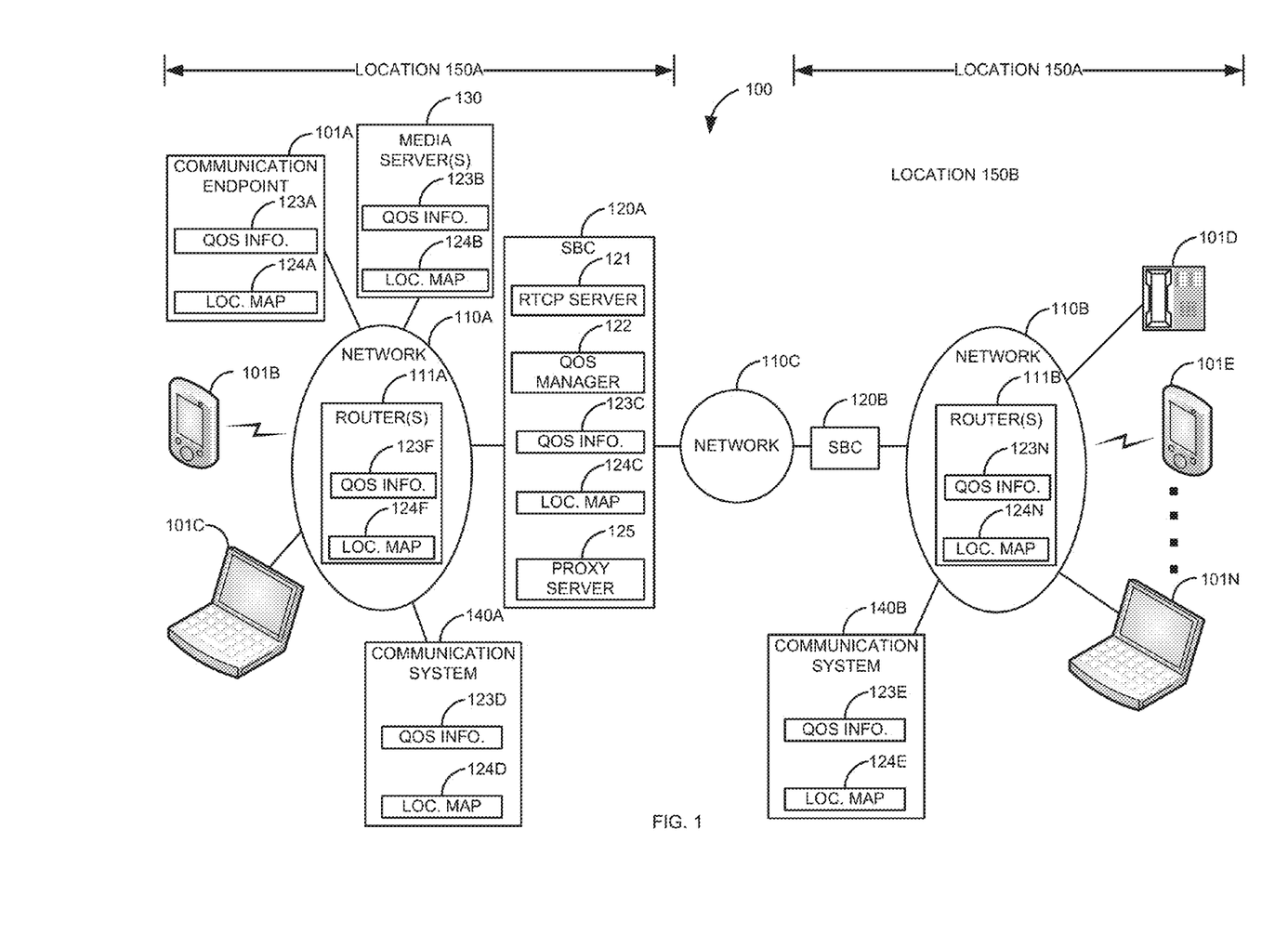
FIG. 1 is a block diagram of a first illustrative system for managing QoS information in a distributed environment.

FIG. 1 is a block diagram of a first illustrative system 100 for managing QoS information 123 in a distributed environment. The first illustrative system 100 comprises communication endpoints 101A-101N, networks 110A-110C, Session Border Controllers (SBCs) 120A-120B, media server(s) 130, and communication systems 140A-140B.

FIG. 1 also comprises two locations 150A-150B that are separate locations (e.g. physical locations) 150A-150B that are controlled by different communication systems 140A-140B. For example, the location 150A may be a first corporate network 110 in the United States controlled by the communication system 140A and the location 150B may be a second corporate network 110 in India controlled by the communication system 140B that are separated by the Internet (network 110C).

The communication endpoint 101 can be or may include any device that can communicate on the network 110, such as a Personal Computer (PC), a telephone, a video system, a cellular telephone, a Personal Digital Assistant (PDA), a tablet device, a notebook device, a smart phone, an Interactive Voice Response (IVR system, and/or the like. As shown in FIG. 1, any number of communication endpoints 101A-101N may be connected to the networks 110A-110B, including only a single communication endpoint 101.

The communication endpoint 101A further comprises QoS information 123A and a location map 124A. The QoS information 123A is shown in the communication endpoint 101A. Although not shown in the communication endpoints 101B-101N for simplicity, the QoS information 123 may also be captured and stored in some or all of the communication endpoints 101B-101N. The QoS information 123B-123N is also captured for the routers 111A-110B, the SBC 120A, the media server(s) 130, and the communication systems 140A-140B. Although not shown the SCB 120B may also include captured QoS information 123.

The QoS information 123 may be any information related to network communication session, such as, quality, location 150, communication devices involved in a communication session, (e.g., communication endpoint 101, router 111, SBC 120, media server 130, communication system 140, and/or the like), jitter, packet loss, round-trip-time, user reported problems, codec type, routing information, packet priority, and/or the like. The QoS information 123 may be for a specification communication session. For example, the QoS information 123 may be for a specific voice, video, and/or Instant Messaging (IM) communication session. The QoS information 123 may be for a specific time or duration. For example, the QoS information 123 may be for jitter over a time period for all communication devices 101 in location 150A.

The QoS information 123 may be in various formats. For example, the QoS information 123 may be in eXtended Markup Language (XML), in a format separated by defined characters, in a database, and/or the like.

The QoS information 123 for each network element (e.g., 101, 111, 120, 130, 140, etc.) that captures the QoS information 123 will be from the individual network element's perspective. For example, the QoS information 123A will be for communication sessions with the communication endpoint 101A.

The location map 124 comprises location 150 information for multiple locations 150. For example, the location map 124 may comprise a range of IP addresses for multiple locations 150 and other information related to multiple locations 150 as described hereafter. The location map 124A is only shown in the communication endpoint 101A for simplicity. However, the communication endpoints 101B-101N may also include the location map 124. The routers 111A-111B, the SBC 120A, the media server(s) 130, and the communication systems 140A-140B also comprise the location maps 124B-124N. The location maps 124A-124N may be similar or different based on implementation.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), H.323, video protocols, Instant Messaging (IM) protocols, and/or the like. Thus, the network 110 is an electronic communication network configured to carry messages via packets and/or circuit switched communications.

In FIG. 1, there are three networks 110A-110C. In a typical configuration, the networks 110A-110B are separate networks, such as a LAN for a corporate network 110 and the network 110C is the Internet or the Public Switched Telephone Network (PSTN). However, the descriptions herein are not limited to this configuration. For example, the networks 110A-110C may all be private networks.

The network 110A-110B further comprises routers 111A-111B. The routers 111A-111B can be or may any include any hardware device coupled with software that can route packets. The routers 111A-111B further comprises the QoS information 123F-123N and the location maps 124F-124N. For example, each of the routers 111A-111B may include QoS information 123F-123N about packets that are sent and received by the routers 111A-111B. The routers 111A-111B may have different locations maps 124F-124N in order to maintain public/private IP address mappings across the networks 110A-110C.

The SBC 120 can be any hardware coupled with software that can manage a border between two networks 110, such as a firewall, a Network Address Translator (NAT), and/or the like. The SBC 120A is shown with an RTCP server 121, a QoS manager 122, the QoS information 124C, the location map 124C, and a proxy server 125. Although not shown, the SBC 120B may comprise some or all of the same elements as the SBC 120A.

The RTCP server 121 can be or may include any hardware coupled with software that can provide Real-Time Communication Protocol (RTCP) communications sessions between the communication endpoints 101A-101N, such a voice, video, and/or IM communication sessions. For example, the RTCP server 121 may relay a voice media stream between the communication endpoint 101A and the communication endpoint 101D. The RTCP server 121, in this embodiment, acts as a media relay between the network 110A and the network 110B.

In one embodiment, the RTCP server 121 may also include the QoS manager 122. In this embodiment, the RTCP server is a central point for managing QoS information 123 between the networks 110A and 110B.

The QoS manager 122 can be or may include any hardware coupled with software that can collect QoS information 123 for communication sessions. The QoS manager 122 can collect the QoS information 123A-123N into a single collection of QoS information 123C.

The proxy server 125 can be or may include any proxy server 125 that can provide proxy services for communication sessions, such as a Session Initiation Protocol (SIP) proxy server 125.

The media server(s) 130 can be or may include any hardware coupled with software that can provide media services, such a video server, a music server, an Interactive Voice Response (IVR) system, and/or the like. The media server(s) 130 may include multiple instances of a media server 130. For example, a second media server 130 may be implemented on a thread or a second core of multi-processing processing operating system. The media server(s) 130 further comprise the QoS information 123B and the location map 124B.

The communication systems 140A-140N can be or may include any hardware coupled with software that can manage communication sessions, such as a Private Branch Exchange (PBX), a switch, a session manager, a communication manager, and/or the like.

Figure 2:
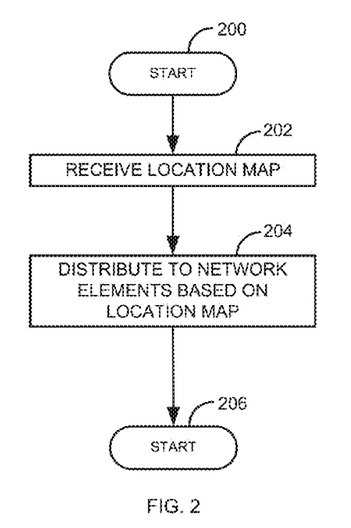
FIG. 2 is a flow diagram of a process for distributing location maps in a network.

FIG. 2 is a flow diagram of a process for distributing location maps 124 in a network 110. Illustratively, the communication endpoints 101A-101N, the routers 111A-111B, the session border controllers 120A-120B, the RTCP server 121, the QoS manager 122, the proxy server 125, the media server(s) 130, and the communication systems 140 are stored-program-controlled entities, such as a computer or processor, which performs the method of FIGS. 2-5 and the processes described herein by executing program instructions stored in a computer readable storage medium, such as a memory or disk. Although the methods described in FIGS. 2-5 are shown in a specific order, one of skill in the art would recognize that the steps in FIGS. 2-5 may be implemented in different orders and/or be implemented in a multi-threaded environment. Moreover, various steps may be omitted or added based on implementation.

The process starts in step 200. The QoS manager 122 receives a location map 124C in step 202. The location map 124C can be generated in various ways. For example, the location map 124C may be created automatically by the communication system 140. Alternatively, an administrator may create a location map. The location map 124 is based on the communication elements associated with the locations 150A-150B. For example, below is an exemplary XML version of a location map 124.

```
<IP-Range>
    <Range> aaaa-bbbb </Range>,
    <Location>1</Location>
    <Mask>24</Mask>
    <RTCP-Delta>
        <Jitter-Delta> A</Jitter-Delta>
        <Packet-loss> B</Packet-loss>
        <Round-trip-time> C </Round-trip-time>
        <User-reported-problems>D</User-reported-problems>
    </RTCP-Delta>
</IP-Range>
<IP-Range>
    <Range> eeee-ffff </Range>
    <Location>2</Location>
    <Mask>24</Mask>
    <RTCP-Delta>
        <Jitter-Delta> X</Jitter-Delta>
        <Packet-loss> Y</Packet-loss>
        <Round-trip-time> Z </Round-trip-time>
        <User-reported-problems>T</User-reported-problems>
    </RTCP-Delta>
</IP-Range>
```

The first IP-Range field is used to identify a range of IP addresses (e.g., 124.111.111.000 to 124.111.111.256 for the first location (e.g., location 150A). For example, the communication endpoints 101A-101C, the router(s) 111A, the SBC 120A, the media server(s) 130, and the communication system 140A can have IP addresses within the first IP-Range field for the first location 150A. The first Location field is used to identify the location 150A. The first Mask field is used to identify a sub-net mask for the IP addresses in the location 150A. The first RTCP-Delta field is for a group of fields that identify QoS information 123. In this example, the QoS parameters for jitter, packet loss, round-trip-time, and user reported problems are the fields supported in the first RTCP-Delta field. The QoS information 123 may include other fields, such as a codec supported, a packet priority, and/or the like.

The second IP-Range field is used to identify a range of IP addresses for the second location (e.g., location 150B). For example, the communication endpoints 101D-101N, the router(s) 111B, the SBC 120B, and the communication system 140B can have IP addresses within the IP-Range field for the second location 150B. The second Location field is used to identify the location 150B. The second Mask field is used to identify a sub-net mask for the IP addresses in the location 150B. The second RTCP-Delta field is for a group of fields that identify QoS information 123. In this example, the QoS parameters for jitter, packet loss, round-trip-time, and user reported problems are the fields supported in the second RTCP-Delta field.

In one embodiment, each of the IP Range field(s) are for routable IP addresses. In this example, the location map 124 will use different ranges of routable IP addresses for each location 150.

In a second embodiment, one or more of the IP Range field(s) may use a non-routable Internet Protocol (IP) address. Non-routable IP addresses are IP addresses that are reserved for private networks, such as 10.0.0.0-10.255.255.255, 172.16.0.0-172.31.255.255, and 192.168.0.0-192.168.255.255. In this case, the location map 124 will include a public IP address, a port number, and the non-routable IP address to identify a specific network element. This information is typically captured by a Network Address Translator (NAT) that is typically in the SBC 120. The NAT can provide this information in order to build the location map 124.

The QoS manager 122 distributes, in step 204, the location map 124C to each of the communication endpoints 101A-101N, the routers 111A-111B, the SBCs 240A-240B, the media server(s) 130, and the communication systems 140A-140B (network elements). The QoS manager 122 sends the location map 123 to each of the network elements using an address, such as an IP address. If one of the communication systems 140A-140B sent the location map 124C in step 202, the distribution of the location map 124C to this network element is unnecessary. For example, if the communication system 140A sent the location map 124, there would be no need to send the location map 124 back to the communication system 140A because the communication system 140A already has the location map 124.

The location map 124C may be distributed in various ways, such as, by sending a SIP PUBLISH message to each of the network elements. For example, the QoS manager 122 may send the location map 124C to each of the network elements by using each IP address in the range of IP addresses in the IP-Range field for each location 150A-150B.

Based on the location map 124, each of the network elements captures QoS information 123 for communication sessions. For example, for a voice call between the communication endpoints 101A and 101D, the network elements 101A, 111A, 120A, 120B, 111B, and 101D can all capture QoS information 123 (e.g., for jitter, packet loss, round-trip-time, and user reported problems). These network elements can then send the QoS information 123 to the QoS manager 122.

Figure 3:
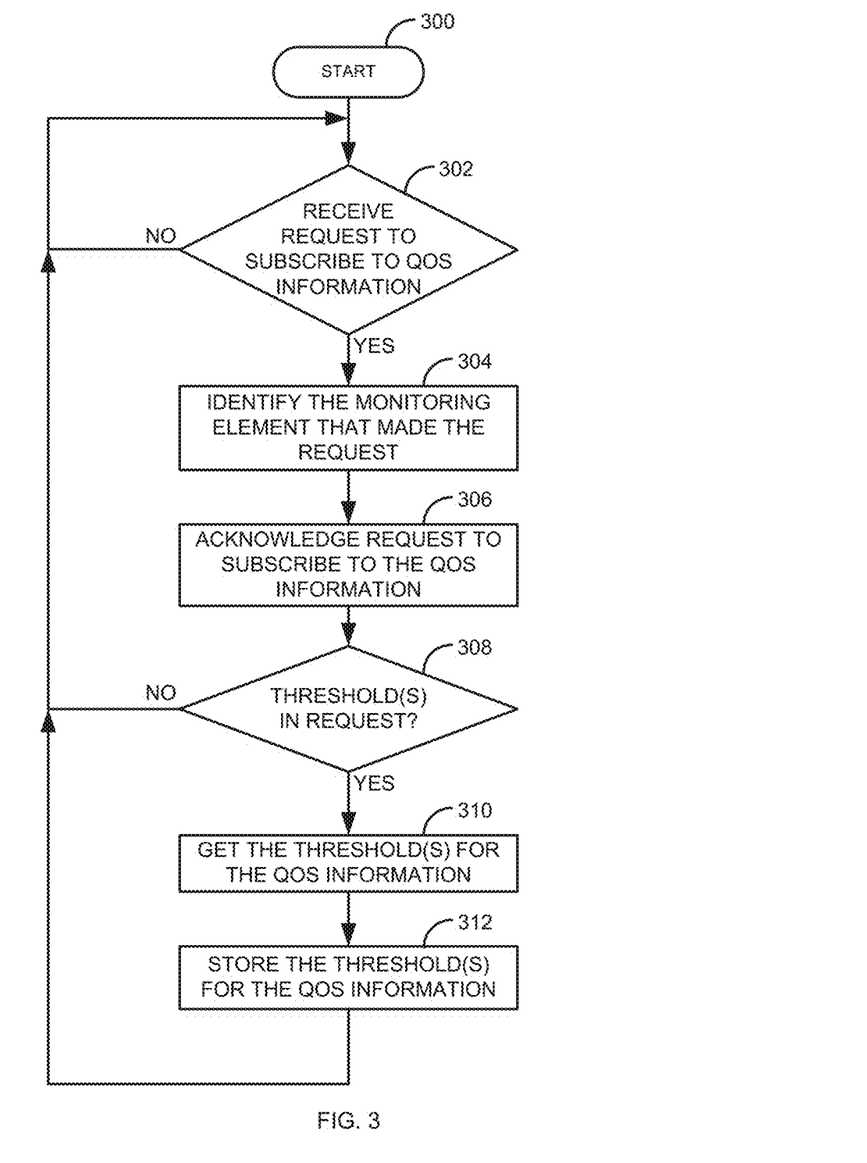
FIG. 3 is a flow diagram of a process for capturing QoS information in a distributed environment.

FIG. 3 is a flow diagram of a process for capturing QoS information 123 in a distributed environment. The process of FIG. 3 is shown from the perspective of the QoS manager 122.

The process starts in step 300. The QoS manager 122 waits to receive a request to subscribe to the QoS information 123C in step 302. If a request to subscribe to the QoS information 123C is not received in step 302, the process repeats step 302.

Otherwise, if a request to subscribe to the QoS information 123C is received in step 302, the QoS manager 122 identifies the monitoring element that made the request in step 304. For example, if the communication system 140A sent a SIP SUBSCRIBE message to the QoS manager 122 to subscribe to the QoS information 123C, the QoS manager 122 would identify the communication system 140A. The monitoring element can be any device that wants to receive the QoS information 123C (or a subset of the QoS information 123C), such as the communication system 140, a network management system, a contact center control system, a media server manager, and/or the like.

In one embodiment, multiple network elements can send requests to subscribe to the QoS information 123C. For example, both of the communication systems 140A-140B may each sends a SIP SUBSCRIBE message to the QoS manager 122 in step 302.

The QoS manager 122 acknowledges the request to subscribe to the QoS information 123C in step 306. For example, by sending a SIP 200 OK message. The QoS manager 122 determines in step 308 if there is one or more threshold(s) in the request to subscribe to the QoS information 123C. A threshold may be a value that causes the QoS manager 122 to send the QoS information 123C (or a subset of the QoS information 123C) to the specific monitoring element. For example, the threshold may be based on a timer, such as sending the QoS information 123C every 10 seconds to the communication system 140A.

Alternatively, the threshold may be based on one or more of the QoS parameters. For example, the QoS manager 122 may send the QoS information 123C if a packet jitter parameter exceeds a specific amount for a specific location 150. In some embodiments, there may not be any threshold (s) that are sent in the request. For example, instead of sending a request, an administrator can administrator the thresholds for the QoS manager 122. The threshold may be based on a Service Level Agreement (SLA) between an entity and a service provider.

The threshold can also be based on steps. For a defined percentage increase, the QoS manager 122 may send the QoS information 123C. For example, if the threshold is for a 5% packet loss, the QoS information 123C may be sent each time when the threshold increases 5% (e.g., 5%, 10%, 15%, etc.).

A threshold may be received from multiple monitoring elements that may want to track different QoS parameters. For example, different monitoring elements may each send a request to subscribe to the QoS information 123C that each has different threshold(s) for different QoS parameters.

If there is not a threshold(s) in the request in step 308, the process goes back to step 302. Otherwise, if there is a threshold(s) in the request in step 308, the QoS manager 122 gets the threshold(s) for the QoS information 123C in step 310. The QoS manager 122 stores the thresholds in step 312 and the process goes to step 302.

Figure 4:
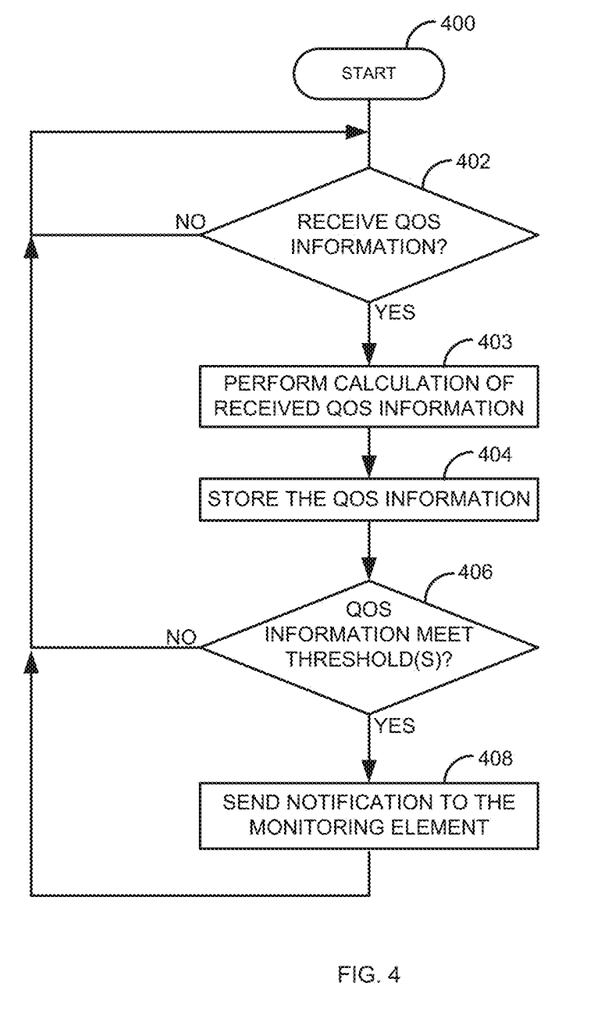
FIG. 4 is a flow diagram of a process for sending QoS information in a distributed environment.

FIG. 4 is a flow diagram of a process for sending QoS information 123 in a distributed environment. The process starts in step 400. The QoS manager 122 waits in step 402 to receive the QoS information 123. For example, the communication endpoints 101A-101N may send their respective QoS information 123 to the QoS manager 122 every 10 seconds. Similarly, the routers 111A-111B may send their respective QoS information 123 to the QoS manager 122 periodically.

If there is not any QoS information 123 received in step 402, the process of step 402 repeats. Otherwise, if there is QoS information 123 received in step 402, the QoS manager 122 performs a calculation of the received QoS information in step 403. For example, the QoS manager 122 may perform a calculation over a time period for information received in step 402. The QoS manager 122 stores the QoS information 123 in step 404. The QoS manger 122 determines, in step 406, if the QoS information 123 meets a threshold(s). A threshold can be a defined level or reaching a specific amount of time (e.g., a threshold of time). For example, a threshold may be an amount of jitter for one or more calls over time, a number of dropped packets in a number of communication sessions over time, a number of lost packets from a location 150 over a time period, a round-trip time of a packet, a number of lost packets for a packet priority over time from a location 150, and/or the like. Alternatively, the threshold can be for an increase of the QoS parameter, a decrease in the QoS parameter, an intercept of a user indicated problem, and/or the like. If the QoS information 123 does not meet one of the threshold(s) in step 406, the process goes to step 402.

Otherwise, if the QoS information 123 meets the threshold (e.g., when combined with previously received QoS information 123), the QoS manager 122 sends a notification to the monitoring element in step 408. For example, if the communication system 140A (a monitoring element) had sent a SIP SUBSCRIBE in step 302 to receive QoS information 123 when a round-trip-time or packet loss over a time period threshold has been met, the QoS manager 122 would send a SIP PUBLISH message. For example, the SIP PUBLISH message may include the following information format using XML.

```
<Connectivity-info>
    <Location>1</Location>
    <Round-trip-time> x </Round-trip-time>
</Connectivity-info>
<Connectivity-info>
    <Location>2</Location>
    <Packet-loss>7</Packet-loss>
</Connectivity-info>
```

The monitoring element then uses the SIP PUBLISH to implement an action.

Figure 5:
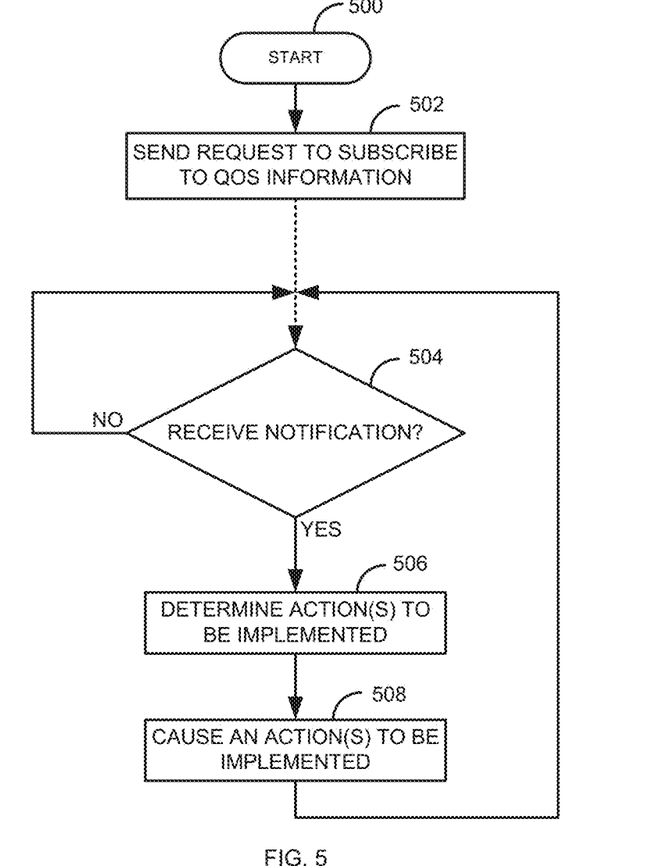
FIG. 5 is a flow diagram of a process for implementing actions based on QoS information.

FIG. 5 is a flow diagram of a process for implementing actions based on QoS information 123. The process of FIG. 5 is from the perspective of a monitoring element. The process starts in step 500. The monitoring element sends a request to subscribe to QoS information 123 in step 502 (which is received by the QoS monitor 122 in step 302).

The monitoring element (e.g., the communication system 140) waits to receive a notification in step 504 (the notification of step 408). If a notification has not been received in step 504, the process of step 504 repeats. Otherwise, if a notification has been received in step 504, the monitoring element determines, in step 506, any actions to be implemented. The monitoring element then causes the action(s) to be determined in step 508 and the process goes back to step 504.

An action can be any action that may be taken based on the QoS information 123. For example, the action may be to instantiate new media server 130 based on a slow response time of an existing media server(s) 130. The new media server 130 may be part of a multi-tasking operating system, may be a new process on a hypervisor running on a new processor core, may be the initiation of a new hardware media server 130, and/or the like.

Alternatively, if an extremely fast response time is received from an existing media server 130, the action may be to reroute communications from an existing media server to another media server 130 and then bring down the existing media server 130.

The action may be to change a route of a real-time communication or to change a packet priority of the real-time communication session. For example, the action may be to send messages to the communication endpoints 101 involved in the communication session to increase a packet priority (e.g., change the packet priority from voice to video) for a voice call. Alternatively, the action may be to change a route of a second communication session based on the QoS information 123 of a first communication session.

The action may be to deny calls. For example, if there is a high packet loss due to a high call volume, the action may be to start denying any new call attempts.

The action may be based on a user reported problem. For example, a user, via a user interface, may indicate a problem by selecting a button on one of the communication endpoints 101. The action may be to notify an administrator of the problem.

The action may be to reroute calls to a different location 150 that is not as heavily loaded. For example, the action may be to switch all new calls to location 150C instead of location 150B.

The monitoring element and/or the QoS manager 122 can take an average of QoS values for all communication endpoints 101 in a given location 150 for a given interval. The time interval can be either a pre-determined engineered value, configurable based on the customer's traffic requirements, dynamically adjusted based on call traffic, and/or the like. The monitoring element may also make use of other statistical algorithms like an arithmetic mean, etc. The result can indicate if the communication endpoints 101 in a location 150 are having QoS problems or not. Based on these values, the QoS manager 122 can provide data based on locations 150 in the monitoring element.

To illustrate, consider the following example. Assume that there are three locations 150A, 150B and 150C. Location 150A has ten communication endpoints 101, location 150B has one thousand communication endpoints 101, and location 150C has fifteen hundred communication endpoints 101. The connectivity of the communication endpoints 101 is as shown in the table below.

| Location | 150A | 150B | 150C |
|---|---|---|---|
| # of endpoints | 10 | 1000 | 1500 |
| How are endpoints connected | All endpoints are talking to location 150B | All endpoints are talking to both locations 150A and 150C. | All active endpoints are connected to location 150B. |

In the above scenario, if there is connectivity problem between locations 150A and 150B, 10 out of 10 endpoints in location 150A would indicate problems. Whereas for the same problem, only 10 out of 1000 endpoints would indicate problems in location 150B. This is because only ten of the communication endpoints 101 are communicating to communication endpoints 101 in location 150A. Hence, only 1% of QoS information 123 in location 150B will indicate problems. The monitoring element can use this information to identify that there is likely a network problem between location 150A and 150B and take the necessary action. After the QoS manager 122 processes the QoS information 123C, the QoS manager 122 sends the QoS information 123C to the monitoring element. The monitoring element can then perform the necessary actions.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those

What is claimed is:

1. A method comprising:
receiving, by a processor, a request to subscribe to Quality of Service (QoS) information from a first monitoring element;
receiving, by the processor, the QoS information from a plurality of network elements at a plurality of locations, wherein the received QoS information is based on a location map that comprises the plurality of locations and wherein separate communication systems control the plurality of locations;
receiving, by the processor, a first threshold for the QoS information from the first monitoring element;
determining, by the processor, that the first threshold for the QoS information has been reached, the first threshold indicating that a QoS problem exists;
in response, notifying, by the processor, the first monitoring element that the first threshold for the QoS information has been reached to cause the monitoring element to address the QoS problem;
receiving, by the processor, a second threshold for the QoS information from a second monitoring element;
determining, by the processor, that the second threshold for the QoS information has been reached; and
in response to determining that the second threshold for the QoS information has been reached, sending, by the processor, the QoS information to the second monitoring element.

2. The method of claim 1, wherein the first threshold is one of: a periodic time, an increase of a QoS parameter, a decrease of a QoS parameter, or an intercept of a user indicated problem.

3. The method of claim 1, wherein the QoS information comprises a fast response time from a first media server and wherein addressing the QoS problem comprises:
rerouting a communication session with the first media server to a second media server; and
bringing down the first media server.

4. The method of claim 1, wherein the QoS information comprises a response time of a first media server and addressing the QoS problem is to instantiate a new media server.

5. The method of claim 1, wherein the location map uses routable Internet Protocol (IP) addresses and wherein each location in the location map uses a different range of routable IP addresses.

6. The method of claim 1, wherein at least one network element in one of the plurality of locations uses a non-routable Internet Protocol (IP) address and wherein the location map identifies the at least one network element in the one of the plurality of locations by a public IP address, a port, and the non-routable IP address.

7. The method of claim 1, wherein the location map comprises a range of Internet Protocol (IP) addresses for each of the plurality of locations.

8. The method of claim 1, further comprising:
receiving, by the processor, the location map; and
distributing, by the processor, the location map to the plurality of network elements at the plurality of locations based on information in the location map.

9. A system comprising:
a microprocessor;
a computer readable medium, coupled with the microprocessor and comprising microprocessor readable and executable instructions for a Quality of Service (QoS) manager that causes the microprocessor to:
receive a request to subscribe to Quality of Service (QoS) information from a first monitoring element;
receive the QoS information from a plurality of network elements at a plurality of locations, wherein the received QoS information is based on a location map that comprises the plurality of locations and wherein separate communication systems control the plurality of locations;
receive a first threshold for the QoS information from the first monitoring element;
determine that the first threshold for the QoS information has been reached, the first threshold indicating that a QoS problem exists; and
in response, notifying the first monitoring element that the first threshold for the QoS information has been reached to cause the monitoring element to address the QoS problem;
receive a second threshold for the QoS information from a second monitoring element;
determine that the second threshold for the QoS information has been reached; and
in response to determining that the second threshold for the QoS information has been reached, send the QoS information to the second monitoring element.

10. The system of claim 9, wherein the first threshold is one of: a periodic time, an increase of a QoS parameter, a decrease of a QoS parameter, or an intercept of a user indicated problem.

11. The system of claim 9, wherein the QoS information comprises a user reported problem received from one of the plurality of network elements.

12. The system of claim 9, wherein the addressing the QoS problem is to deny one or more calls.

13. The system of claim 9, wherein the location map uses routable Internet Protocol (IP) addresses and wherein each location in the location map uses a different range of routable IP addresses.

14. The system of claim 9, wherein at least one network element in one of the plurality of locations uses a non-routable Internet Protocol (IP) address and wherein the location map identifies the at least one network element in the one of the plurality of locations by a public IP address, a port, and the non-routable IP address.

15. The system of claim 9, wherein the location map comprises a range of Internet Protocol (IP) addresses for each of the plurality of locations.

16. The system of claim 9, wherein the QoS manager causes the microprocessor to:
receive the location map; and
distribute the location map to the plurality of network elements at the plurality of locations based on information in the location map.

17. A method comprising:
sending, by a processor, a request to subscribe to Quality of Service (QoS) information for a plurality of network elements at a plurality of locations that are controlled by separate communications systems, wherein the QoS information is based on a location map that is sent to the plurality of network elements at the plurality of locations;
receiving, by the processor, a notification to the request to subscribe to the QoS information, wherein the notification comprises the QoS information for the plurality of network elements at the plurality of locations;

determining, by the processor, an action to be implemented based on the QoS information, wherein the QoS information comprises a response time from a first instance of a media server; and in response to determining the action to be implemented, causing, by the processor, the action to be implemented, wherein the action to be implemented is to initiate, by the processor, an instantiation of a second instance of the media server.

18. The method of claim 17, wherein the QoS information further comprises a user reported problem received from one of the plurality of network elements.

19. The method of claim 17, wherein the QoS information further comprises a route of a real-time communication session and wherein the action causes the route and/or a packet priority of the real-time communication to change.

20. The method of claim 17, wherein the QoS information further comprises a route of a first real-time communication session and wherein the action causes a route of a second real-time communication to change.

* * * * *